(12) United States Patent
Fransen

(10) Patent No.: US 7,726,257 B2
(45) Date of Patent: Jun. 1, 2010

(54) DEVICE FOR MILKING ANIMALS

(75) Inventor: Renatus Ignatius Josephus Fransen, Vlaardingen (NL)

(73) Assignee: Maasland N.V., Maassluis (NL)

( * ) Notice: Subject to any disclaimer, the term of this patent is extended or adjusted under 35 U.S.C. 154(b) by 47 days.

(21) Appl. No.: 12/124,286

(22) Filed: May 21, 2008

(65) Prior Publication Data

US 2008/0216751 A1 Sep. 11, 2008

Related U.S. Application Data

(63) Continuation of application No. PCT/EP2006/010440, filed on Oct. 30, 2006.

(51) Int. Cl.
*A01J 5/00* (2006.01)

(52) U.S. Cl. .................... 119/14.46; 119/14.01

(58) Field of Classification Search .............. 119/14.01, 119/14.03, 14.46, 14.18, 14.17, 14.14, 14.08, 119/14.51
See application file for complete search history.

(56) References Cited

U.S. PATENT DOCUMENTS

| | | | | |
|---|---|---|---|---|
| 79,317 | A | * | 6/1868 | Colvin .................... 119/14.03 |
| 1,385,500 | A | * | 7/1921 | Shippert ................. 119/14.43 |
| 4,231,324 | A | * | 11/1980 | Schletter ................. 119/14.17 |
| 4,344,385 | A | * | 8/1982 | Swanson et al. ......... 119/14.08 |
| 4,569,236 | A | | 2/1986 | Kitchen et al. |
| 5,913,281 | A | | 6/1999 | van den Berg |
| 6,073,580 | A | * | 6/2000 | Graupner et al. ......... 119/14.08 |
| 6,725,803 | B2 | * | 4/2004 | Van der Lingen et al. 119/14.02 |
| 2001/0054392 | A1 | * | 12/2001 | Fransen et al. ........... 119/14.08 |
| 2003/0116092 | A1 | * | 6/2003 | Veenstra et al. .......... 119/14.47 |
| 2004/0094096 | A1 | * | 5/2004 | Fransen et al. ........... 119/14.43 |
| 2004/0194712 | A1 | * | 10/2004 | Johannesson et al. .... 119/14.18 |

FOREIGN PATENT DOCUMENTS

| | | |
|---|---|---|
| EP | 1138192 A1 | 10/2001 |
| GB | 2055543 A | 3/1981 |

* cited by examiner

*Primary Examiner*—Rob Swiatek
*Assistant Examiner*—Kristen C Hayes
(74) *Attorney, Agent, or Firm*—David P. Owen; Coraline J. Haitjema; Howrey LLP

(57) ABSTRACT

A device for milking animals includes a milking robot for automatically connecting at least two teat cups to the teats of an animal to be milked. The milk yielded is collected in a milk container. In each milk line, between a respective teat cup and the milk container, there is provided an auxiliary reservoir for collecting milk obtained at the beginning of the milking process. The auxiliary reservoir has an outlet aperture with a closing device. Each auxiliary reservoir is disposed in a respective mounting block, the various mounting blocks being arranged side by side, and the device is provided with an arrangement for simultaneously operating the closing devices.

10 Claims, 3 Drawing Sheets

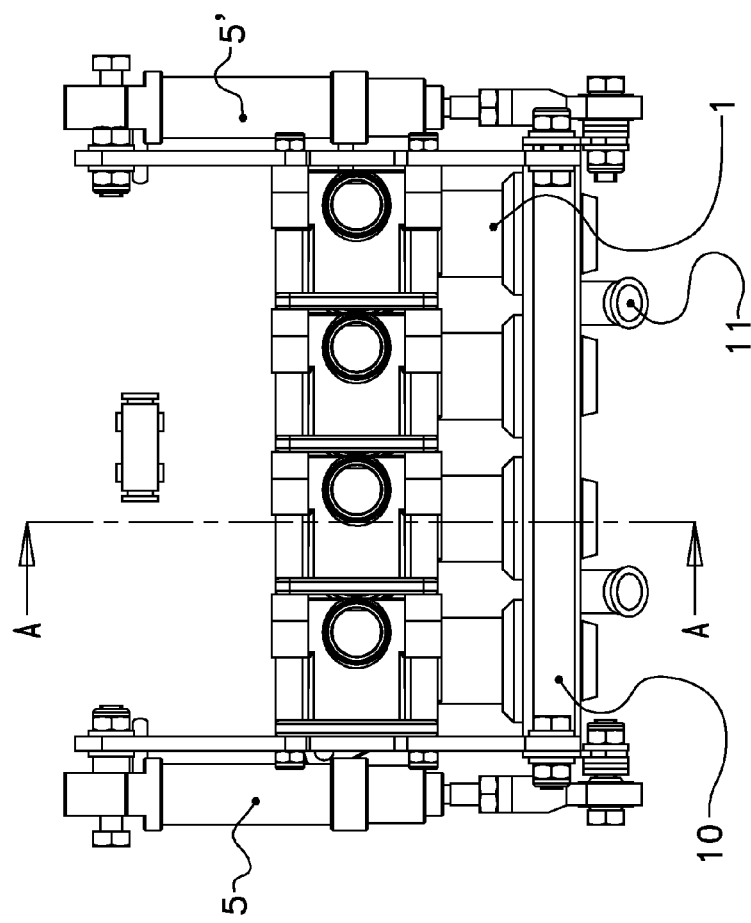
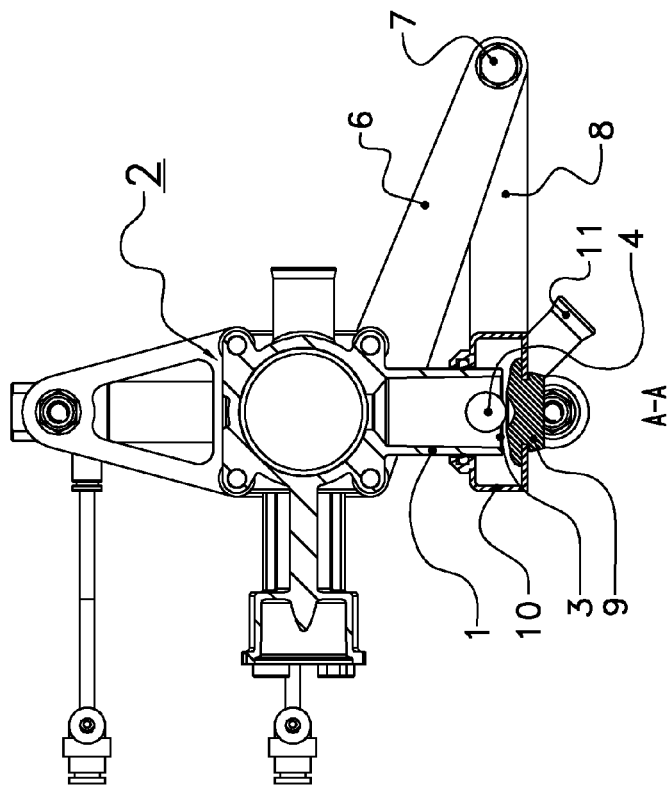
FIG. 1
FIG. 2

DEVICE FOR MILKING ANIMALS

CROSS REFERENCE TO RELATED APPLICATIONS

This application is a continuation of international application no. PCT/EP2006/010440 filed on Oct. 30, 2006, which was published under PCT Article 21(2) in English, the contents of which are hereby incorporated by reference in their entirety.

BACKGROUND OF THE INVENTION

1. Field of the Invention

The present invention relates generally to devices for milking animals and in particular to milking robots for automatically connecting teat cups to the teats of an animal to be milked.

2. Description of the Related Art

A device is known from U.S. 2001/0054392 A1, the contents of which are incorporated by reference in their entirety, in which a milk container is provided for the milk yielded and an auxiliary reservoir is disposed in each milk line between a respective teat cup and the milk container. A particular quantity of milk, substantially obtained at the beginning of the milking process, is collected in each auxiliary reservoir via an inlet aperture and can leave the auxiliary reservoir via an outlet aperture having a closing device. The milk obtained thereafter is led to the milk container. Such an arrangement can be applied, for example, to a device for milking animals as described in U.S. 2004/0094096 A1, the contents of which are also incorporated by reference in their entirety.

The present invention aims at improving the combination of these devices.

BRIEF SUMMARY OF THE INVENTION

According to the present invention there is provided an auxiliary reservoir disposed in each milk line between a respective teat cup and the milk container, in which auxiliary reservoir a particular quantity of milk, substantially obtained at the beginning of the milking process, is collected via an inlet aperture and can leave the auxiliary reservoir via an outlet aperture having a closing device, the milk obtained thereafter being led substantially to the milk container, wherein each auxiliary reservoir is disposed in a respective mounting block, the mounting blocks being arranged side by side, and in that the device is provided with an arrangement for operating simultaneously the closing device.

This makes it possible to discharge the milk obtained by all the teat cups at the beginning of the milking process, also called foremilk, simultaneously by one device. Consequently, the device comprises fewer components and can be designed more compactly and cheaper.

Favourable embodiments of the invention are described in the subclaims and in the following description.

BRIEF DESCRIPTION OF THE DRAWINGS

The invention will now be explained in further detail with reference to the accompanying figures, in which:

FIG. 1 is a schematic cross-sectional view of an embodiment of a device according to the invention;

FIG. 2 is a schematic side view of the device according to FIG. 1, and

DESCRIPTION OF ILLUSTRATIVE EMBODIMENTS

The invention will be described with reference to a device comprising four teat cups and four respective milk lines, although it will be obvious that the invention is also applicable to a device comprising a number of two or more teat cups.

The device for milking animals may be of the type as described in US 2004/0094096 A1 in which in each milk line to the milk container there is provided a mounting block with the means mentioned in US 2004/0094096 A1. Four mounting blocks are arranged side by side and form one single unit. The components and materials described in US 2004/0094096 A1 are referred to in the present document.

On each of these mounting blocks there is disposed an auxiliary reservoir with a closing device, as described in U.S. 2001/0054392 A1, of which the components and materials described are referred to in the present document. The auxiliary reservoir collects the foremilk that can be discharged via an outlet aperture. The outlet aperture is closable by the closing device, preferably in the form of a ball. Disposing such an auxiliary reservoir on a mounting block requires only normal professional knowledge and will therefore not be described here in further detail.

Figure 3:
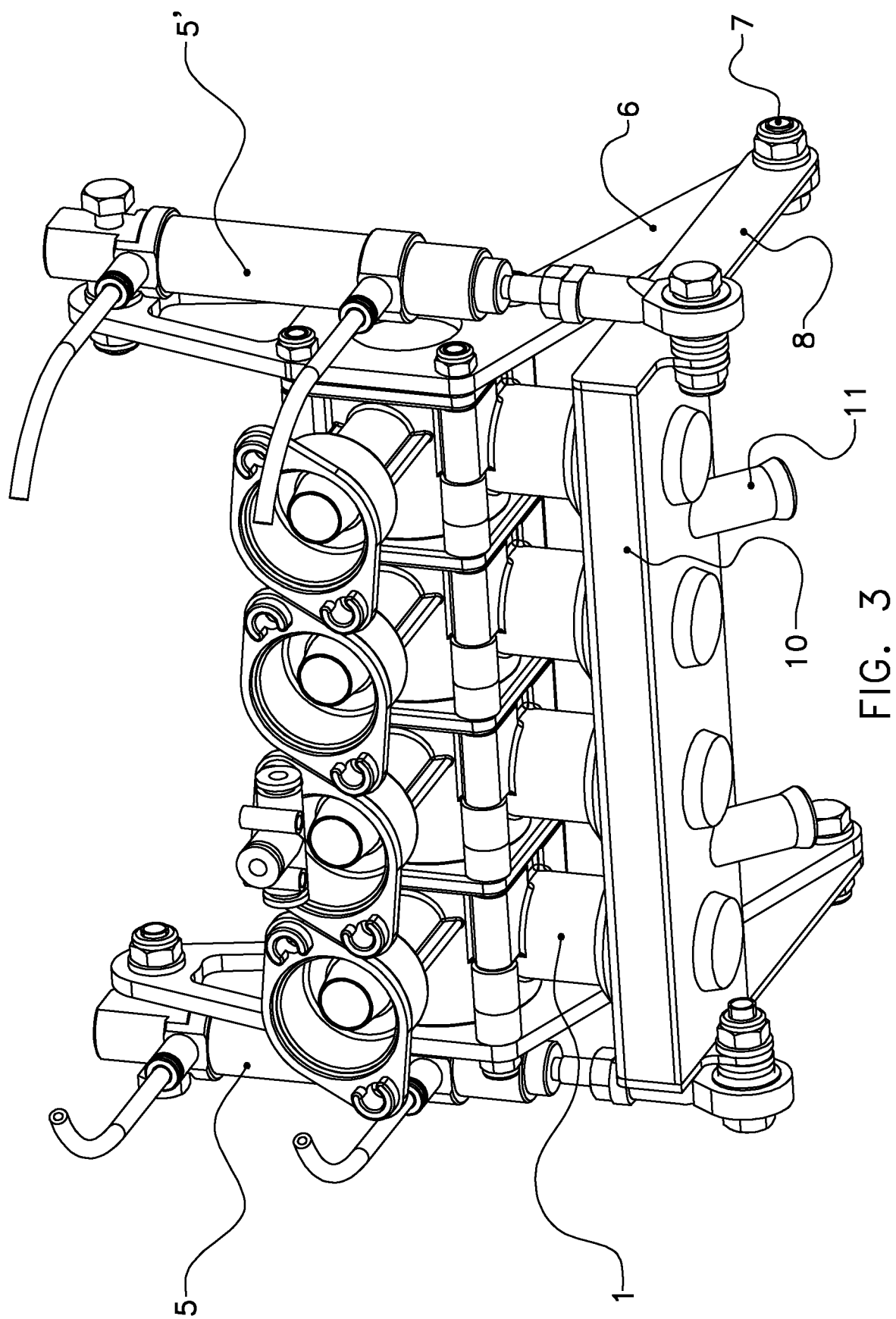
FIG. 3 is a schematic perspective view of the device shown in FIGS. 1 and 2.
Figure 4:
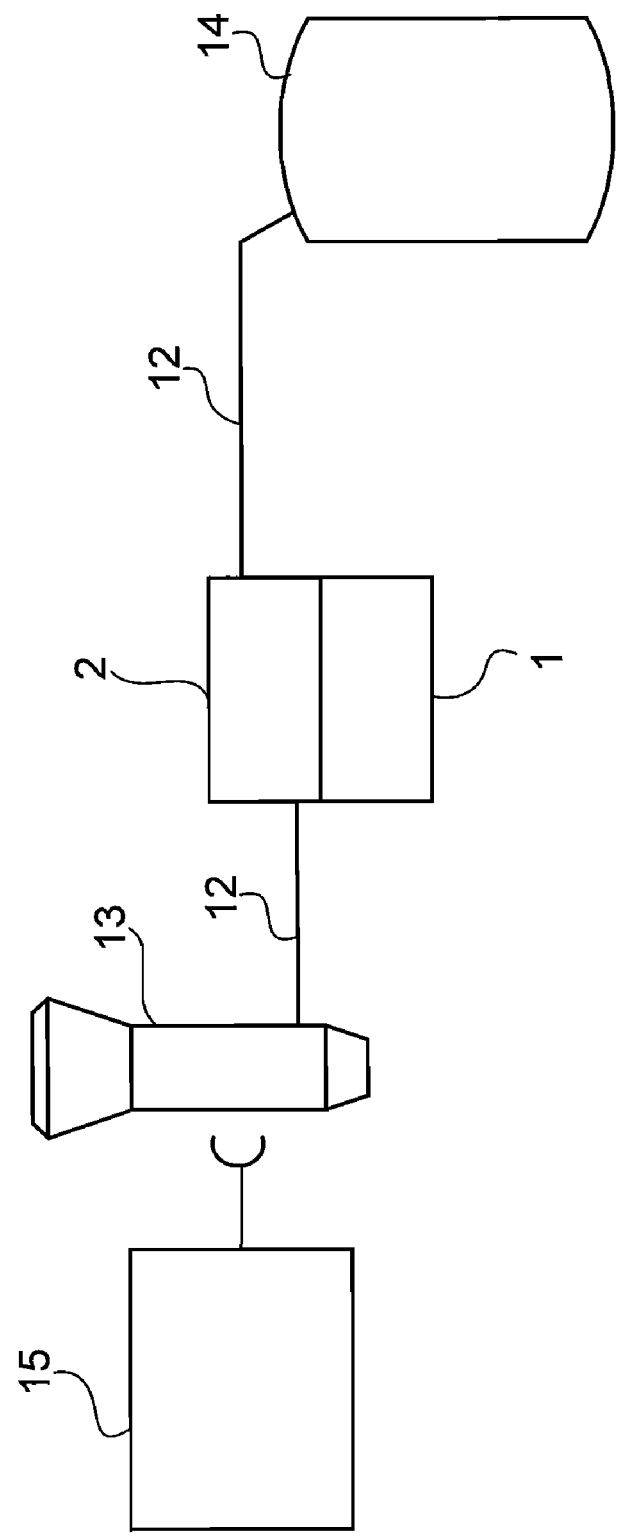
FIG. 4 is a simplified schematic diagram of the device shown in FIGS. 1 and 2 in combination with a teat cup, milk line and milk container.

FIG. 1 shows a cross-sectional view of such a combination of an auxiliary reservoir 1 and a mounting block 2. The mounting block 2 forms part of the milk line 12 from a teat cup 13 to a milk container 14. The auxiliary reservoir has an outlet aperture 3 that is closable by a closing device in the form of a ball 4. FIGS. 2 and 3 show that four of such combinations of mounting blocks and auxiliary reservoirs are arranged side by side. FIG. 4 shows the milk line 12 with auxiliary reservoir 1 and mounting block 2, connecting teat cup 13 to milk container 14, and also a milking robot 15 for automatically connecting the teat cups to the teats of an animal to be milked.

The milk obtained by means of the teat cup 13 will not flow directly to the milk container 14 because of the presence of the mounting block 2 in the milk line 12 and the aperture provided at the lower side thereof, said aperture being in connection with the auxiliary reservoir 1, as a result of the fact that the mounting block forms a resistance to the milk flow. This resistance is realized by the staggered interruption, located in a substantially horizontal plane, in the milk line 2. Therefore, the first milk obtained will fill in the first instance the auxiliary reservoir 1 via the inlet aperture at the lower side of the mounting block 2. In the auxiliary reservoir 1 there is provided a closing device 4 that shuts off the auxiliary reservoir as soon as the latter is filled with the foremilk. The closing device 4 comprises a float which is designed as a ball in the present embodiment. After the auxiliary reservoir 1 has been filled, the ball 4 comes against a seat of the inlet aperture so that the auxiliary reservoir 1 is shut off and the subsequent milk flow will stream via the mounting block 2 to the milk container 14.

The device further comprises an arrangement 5, 5', 6, 7, 8, 9 for operating simultaneously the closing devices 4. The arrangement for operating simultaneously the closing devices 4 comprises a beam 9 extending below all auxiliary reservoirs 1. The beam 9 has its ends connected with a device for moving the beam 9 away from the auxiliary reservoir and towards the auxiliary reservoir. In the embodiment shown, this device comprises operating cylinders 5, 5', for example hydraulically, pneumatically or electrically controllable, and for each cylinder two arms 6, 8 that are interconnected via a pivot axis 7.

The beam 9 comprises contact parts for contacting the respective closing devices 4, so that when the beam 9 is being moved towards the auxiliary reservoir 1, the respective auxiliary reservoirs 1 are closable. The contact parts of the beam preferably comprise resilient material, and a recess in the form of a segment of a sphere for receiving the ball 4 therein.

The closing aperture 3 and the beam 9 are surrounded by a hollow beam construction 10 so that the space between the outlet aperture 3 and the beam 9 will remain fluid-tightly closed over the entire movement stroke of the beam 9. In the hollow beam construction 10 there are disposed discharge pipe elements 11 for discharging foremilk that has penetrated into the beam construction 10 after the outlet apertures 3 have been opened.

The invention is not limited to the shown embodiments. It will be understood that while reference is given to a single milk container, there may be provided separate milk containers for each teat cup and milk line. Similarly, although a ball is shown, alternative closing devices may be foreseen including flaps, diaphragms and any other equivalent member. The person skilled in the art will be able to apply various further modifications and adaptations without departing from the spirit and scope of the invention, the scope of protection for the invention being determined by the accompanying claims.

What is claimed is:

1. In a milking parlor, a device for milking animals the device comprising:
   - a milking robot for automatically connecting at least two teat cups to the teats of an animal to be milked;
   - at least one milk container for the milk yielded;
   - at least two milk lines, each milk line between a respective teat cup and the milk container;
   - at least two auxiliary reservoirs, each auxiliary reservoir disposed in a milk line for collecting a specific quantity of milk, obtained substantially at the beginning of the milking process, each auxiliary reservoir having an inlet aperture for receiving the specific quantity of milk and an outlet aperture having a closing device, by which the milk can leave the auxiliary reservoir, whereby the milk obtained after the specific quantity is led to the milk container; and
   - an arrangement for linking and simultaneously operating the closing devices of the auxiliary reservoirs, and releasing the collected milk.

2. The device as claimed in claim 1, wherein the closing devices comprise floats in the auxiliary reservoirs.

3. The device as claimed in claim 2, wherein the closing device in each auxiliary reservoir operates to shut off the inlet aperture and the outlet aperture of the auxiliary reservoir.

4. In a milking parlor, a device for milking animals the device comprising:
   - a milking robot for automatically connecting at least two teat cups to the teats of an animal to be milked;
   - at least one milk container for the milk yielded,
   - at least two milk lines, each milk line between a respective teat cup and the milk container;
   - at least two auxiliary reservoirs, each auxiliary reservoir disposed in a milk line for collecting a specific quantity of milk, obtained substantially at the beginning of the milking process, each auxiliary reservoir having an inlet aperture for receiving the specific quantity of milk and an out aperture having a closing device, by which the milk can leave the auxiliary reservoir, whereby the milk obtained after the specific quantity is led to the milk container; and
   - an arrangement for simultaneously operating the closing devices of the auxiliary reservoirs, the arrangement comprising a beam extending along the auxiliary reservoirs, the beam being connected to a device for moving the beam away from the auxiliary reservoirs and towards the auxiliary reservoirs to operate the closing devices and release the collected milk.

5. The device as claimed in claim 4, wherein the device for moving the beam away from the auxiliary reservoirs and towards the auxiliary reservoirs comprises a controllable operating cylinder and a pivot axis, the beam pivoting about the pivot axis when the operating cylinder is operated.

6. The device as claimed in claim 4, wherein the beam comprises contact parts of resilient material for operating the closing devices.

7. The device as claimed in claim 6, wherein the closing device comprises a ball, and in that the contact parts comprise a recess for receiving the ball therein.

8. The device as claimed in claim 4, wherein the beam extends below the auxiliary reservoirs.

9. The device as claimed in claim 4, wherein the closing devices comprise floats in the auxiliary reservoirs.

10. The device as claimed in claim 9, wherein the closing device in each auxiliary reservoir operates to shut off the inlet aperture and the outlet aperture of the auxiliary reservoir.

* * * * *